United States Patent
Takeoka et al.

(10) Patent No.: US 11,296,513 B2
(45) Date of Patent: Apr. 5, 2022

(54) STATION BUILDING POWER SUPPLY

(71) Applicant: Mitsubishi Electric Corporation, Tokyo (JP)

(72) Inventors: Toshiaki Takeoka, Tokyo (JP); Shinichi Matsumoto, Tokyo (JP); Shuji Ishikura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 12 days.

(21) Appl. No.: 16/630,040

(22) PCT Filed: Jul. 21, 2017

(86) PCT No.: PCT/JP2017/026558
§ 371 (c)(1),
(2) Date: Jan. 10, 2020

(87) PCT Pub. No.: WO2019/016962
PCT Pub. Date: Jan. 24, 2019

(65) Prior Publication Data
US 2021/0091570 A1    Mar. 25, 2021

(51) Int. Cl.
*H02J 3/36* (2006.01)
*H02J 1/14* (2006.01)
*H02J 3/01* (2006.01)

(52) U.S. Cl.
CPC ............... *H02J 3/36* (2013.01); *H02J 1/14* (2013.01); *H02J 3/01* (2013.01)

(58) Field of Classification Search
CPC ........ H02J 3/36; H02J 3/01; H02J 1/14; H02J 9/062; H02M 1/4208; H02M 3/33507
See application file for complete search history.

(56) References Cited

U.S. PATENT DOCUMENTS

| | | | | |
|---|---|---|---|---|
| 4,922,363 A | * | 5/1990 | Long | H01H 9/56 361/146 |
| 4,935,710 A | * | 6/1990 | Yamazaki | H03H 1/0007 333/12 |

(Continued)

FOREIGN PATENT DOCUMENTS

| | | |
|---|---|---|
| JP | 2012228100 A | 11/2012 |
| JP | 2013138552 A | 7/2013 |

(Continued)

OTHER PUBLICATIONS

International Search Report (PCT/ISA/210), with translation, and Written Opinion (PCT/ISA/237) dated Oct. 10, 2017, by the Japan Patent Office as the International Searching Authority for International Application No. PCT/JP2017/026558.

(Continued)

*Primary Examiner* — Jeffrey A Gblende
(74) *Attorney, Agent, or Firm* — Buchanan Ingersoll & Rooney PC (57) ABSTRACT

A station building power supply includes: a power converter that converts DC power to AC power; a casing that houses the power converter; an AC system circuit that supplies the AC power output from the power converter to electrical apparatus outside the casing; and a filter circuit that applies a high-frequency current generated in the power converter from the AC system circuit to the casing. In the station building power supply, the power converter and the casing are grounded.

9 Claims, 4 Drawing Sheets

(56) References Cited

U.S. PATENT DOCUMENTS

| | | | | |
|---|---|---|---|---|
| 5,568,371 | A * | 10/1996 | Pitel | H02J 3/01 363/39 |
| 5,751,138 | A * | 5/1998 | Venkata | H02M 5/4585 323/207 |
| 5,757,099 | A * | 5/1998 | Cheng | H02J 3/01 307/105 |
| 6,624,579 | B2 * | 9/2003 | Yasui | H05B 6/685 315/39.51 |
| 7,656,670 | B2 * | 2/2010 | Perkins, III | H05B 41/28 361/734 |
| 9,252,594 | B2 * | 2/2016 | Yasuda | H02M 1/126 |
| 2004/0155603 | A1 * | 8/2004 | Clegg | H05B 41/282 315/291 |
| 2006/0043793 | A1 * | 3/2006 | Hjort | H02J 9/062 307/1 |
| 2008/0062724 | A1 * | 3/2008 | Feng | H02M 3/33592 363/17 |
| 2009/0140577 | A1 * | 6/2009 | Fishman | H02M 7/49 307/82 |
| 2009/0168474 | A1 * | 7/2009 | Katoh | H02J 3/01 363/78 |
| 2010/0014325 | A1 * | 1/2010 | Raju | H02M 5/271 363/37 |
| 2013/0036759 | A1 * | 2/2013 | Harada | F25B 49/025 62/259.2 |
| 2013/0271056 | A1 * | 10/2013 | Bunte | H02P 29/02 318/503 |
| 2015/0380147 | A1 * | 12/2015 | Takano | H01F 27/02 333/185 |
| 2016/0028274 | A1 * | 1/2016 | Kanda | H02J 9/06 307/66 |
| 2017/0294777 | A1 * | 10/2017 | Teymour Ghasemabadi | H02J 9/062 |
| 2020/0177071 | A1 * | 6/2020 | Zhang | H02J 3/36 |

FOREIGN PATENT DOCUMENTS

| | | |
|---|---|---|
| JP | 2015053770 A | 3/2015 |
| JP | 2015107766 A | 6/2015 |
| WO | 2017115539 A1 | 7/2017 |

OTHER PUBLICATIONS

Indian Office Action dated Jan. 27, 2021 issued by the Indian Patent Office in corresponding Indian Patent Application No. 202027001537 (6 pages).

* cited by examiner

STATION BUILDING POWER SUPPLY

FIELD

The present invention relates to a station building power supply that converts surplus regenerative power from DC power to AC power in a station building that supplies power to an electrical apparatus in the station by using AC power supplied from an AC system and surplus regenerative power of a DC feeder train.

BACKGROUND

Regenerative power generated by a regenerative brake of a DC feeder train is used these days as the running power for another DC feeder train via an overhead line. In such a DC feeding system, the overhead line voltage rises when the regenerative power exceeds the running power in the same substation section, and the overhead line voltage drops when the regenerative power becomes lower than the running power in the same substation section. A station building power supply converts surplus regenerative power generated when the regenerative power exceeds the running power into AC power, and supplies the AC power to an electrical apparatus in the station building via an AC system. By doing so, the station building power supply effectively utilizes surplus regenerative power within a range that does not cause a reverse flow to the AC system, while stabilizing the overhead line voltage. Such a technique is disclosed in Patent Literature 1.

CITATION LIST

Patent Literature

Patent Literature 1: Japanese Patent Application Laid-Open No. 2015-107766

SUMMARY

Technical Problem

In the station building in which the station building power supply is installed, devices such as a power converter that converts surplus regenerative power from DC power to AC power and a transformer that converts the voltage of AC power supplied from an AC system are grounded. In the station building, however, there are cases where each device cannot be grounded individually due to the installation environment such as a subway station or restrictions on the structure of the building. In such a case, the grounding terminal of each device and a grounding electrode provided in the station building are connected by a grounding wire, and the grounding electrode is shared so that each device can be grounded. In a case where a plurality of devices shares a grounding electrode and is grounded, an AC system circuit that is the path of AC power from the station building power supply to the electrical apparatus installed in the station building, and a loop circuit including the grounding wire are formed. In this case, a high-frequency current generated in the power converter of the station building power supply circulates in the loop circuit. In other words, the high-frequency current generated in the power converter leaks out of the station building power device. For this reason, outside the station building power supply, there is a possibility that the electrical apparatus installed in the station building will malfunction due to the influence of the high-frequency current.

The present invention has been made in view of the above, and aims to obtain a station building power supply capable of preventing malfunction of an external electrical apparatus due to a high-frequency current.

Solution to Problem

To solve the above problems and achieve the object, a station building power supply of the present invention includes: a power converter that converts DC power to AC power; a casing that houses the power converter; an AC system circuit that supplies the AC power output from the power converter to an electrical apparatus outside the casing; and a filter circuit that flows a high-frequency current generated in the power converter from the AC system circuit to the casing. The station building power supply is characterized in that the power converter and the casing are grounded.

Advantageous Effects of Invention

According to the present invention, a station building power supply has an effect to prevent malfunction of the external electrical apparatus due to a high-frequency current.

DESCRIPTION OF EMBODIMENTS

The following is a detailed description of station building power supplies according to embodiments of the present invention, with reference to the drawings. Note that the present invention is not limited by the embodiments.

First Embodiment

Figure 1:
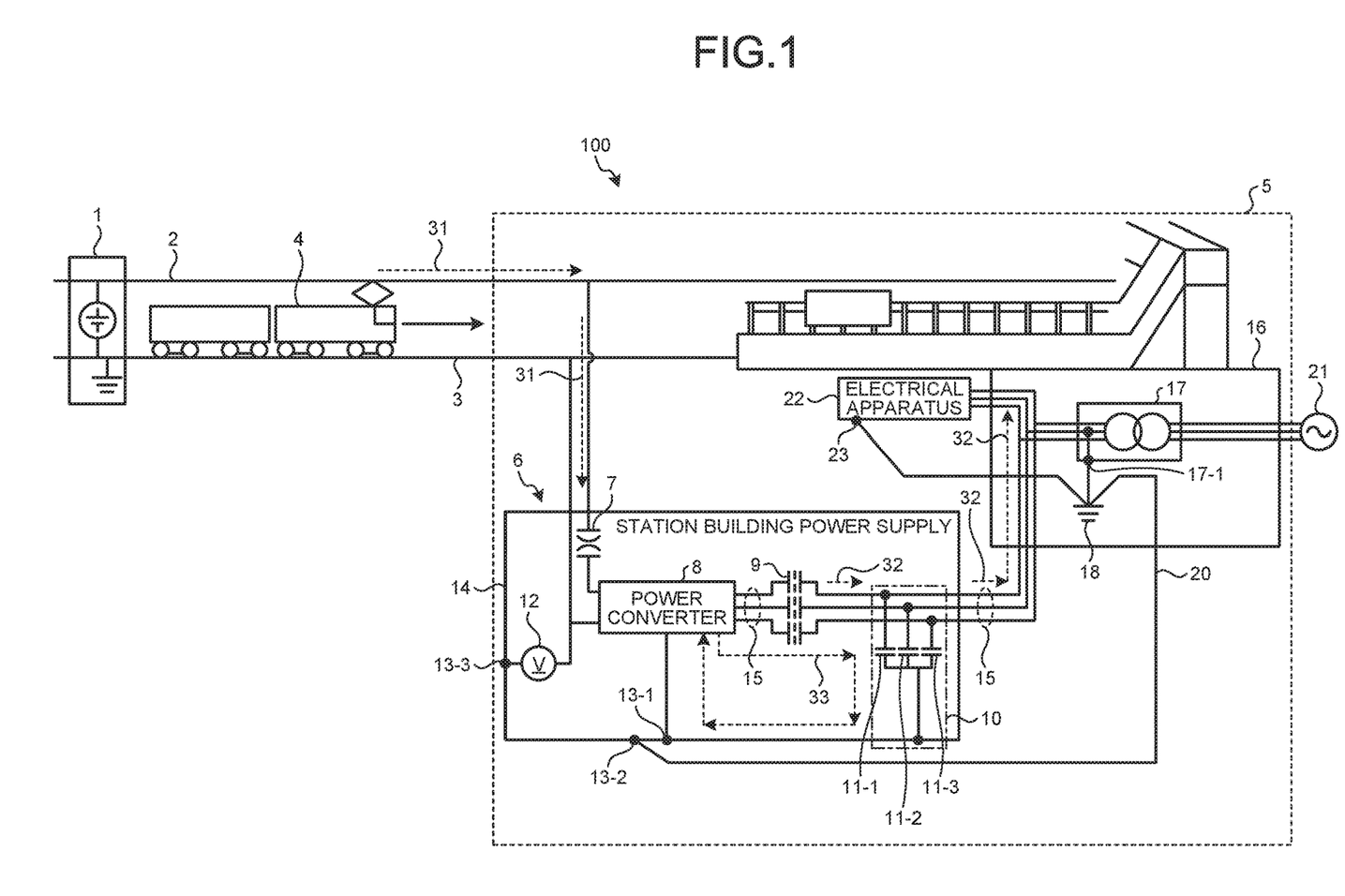
FIG. 1 is a diagram illustrating an example configuration of a railroad system that includes a station building power supply according to a first embodiment.

FIG. 1 is a diagram illustrating an example configuration of a railroad system 100 that includes a station building power supply 6 according to a first embodiment of the present invention. The railroad system 100 includes an electrical substation 1, an overhead line 2, rails 3, a DC feeder train 4, a station building 5, and a commercial power source 21.

The electrical substation 1 is a DC feeding system, and is an electrical substation in the same substation section as the station building 5 including the station building power supply 6. The electrical substation 1 supplies running power, which serves as a propulsive force, to the DC feeder train 4 that travels in the substation section under its control. Note that, although only one DC feeder train 4 is shown in FIG. 1, there are a plurality of DC feeder trains 4 in the substation section controlled by the electrical substation 1.

The overhead line 2 is the path of the current that flows when electric power from the electrical substation 1 is supplied to the DC feeder train 4. Further, the overhead line 2 is the path of the current that flows when regenerative power generated by braking of the DC feeder train 4 is supplied to another DC feeder train 4 (not illustrated) or the station building power supply 6.

The rails 3 form a track on which the DC feeder train 4 travels. The rails 3 also form the path that serves as the return path through which the current returns to the electrical substation 1 via the DC feeder train 4 in a case where the electrical power supplied from the electrical substation 1 is consumed as the running power by the DC feeder train 4.

The DC feeder train 4 consumes the electrical power supplied from the electrical substation 1 as the running power. Further, in the DC feeder train 4, when a brake is applied to the train stopping at a station or the like, regenerative power to serve as the braking force for the DC feeder train 4 is generated. The DC feeder train 4 supplies the generated regenerative power to another DC feeder train 4 (not illustrated) or the station building power supply 6 via the overhead line 2.

The station building 5 includes the station building power supply 6, a station building electrical room 16, and an electrical apparatus 22. The station building power supply 6 converts surplus regenerative power 31 of the DC feeder train 4 from DC power to AC power, and supplies surplus regenerative power 32, which is the AC power after the conversion, to the electrical apparatus 22. The station building electrical room 16 includes a transformer 17. The transformer 17 converts the voltage of AC power supplied from the commercial power source 21 into a voltage that can be used by the electrical apparatus 22, and supplies the converted AC power to the electrical apparatus 22. The electrical apparatus 22 uses both the AC power supplied from the commercial power source 21, and the surplus regenerative power 32 supplied from the station building power supply 6. Note that, although there is one electrical apparatus 22 in the station building 5 in FIG. 1, a plurality of electrical apparatuses 22 are actually provided in the station building 5. The electrical apparatuses 22 are electrical apparatuses such as an air conditioner, a lighting device, an elevator, or railroad signal equipment for the DC feeder train 4 in the station where the station building power supply 6 is installed.

The commercial power source 21 is an AC system that supplies AC power to the electrical apparatus 22.

Next, the configuration of the station building power supply 6 is described. The station building power supply 6 includes: a high-speed circuit breaker 7; a power converter 8; an output electromagnetic contactor 9; a filter circuit 10; a voltage sensor 12; and a casing 14. The station building power supply 6 also includes a part of an AC system circuit 15 that is the path of the AC power at a time when AC power output from the power converter 8 is supplied to the electrical apparatus 22 outside the station building power supply 6 or outside the casing 14. The AC system circuit 15 is a three-wire power line, as illustrated in FIG. 1.

The high-speed circuit breaker 7 is a circuit breaker for blocking an excessive accident current and the like flowing from the overhead line 2 to the power converter 8. The high-speed circuit breaker 7 outputs the surplus regenerative power 31 from the overhead line 2 to the power converter 8 during normal operation.

The power converter 8 is disposed between the high-speed circuit breaker 7 and the output electromagnetic contactor 9, and converts the surplus regenerative power 31, which is DC power generated by the DC feeder train 4, into AC power of the voltage being used by the electrical apparatus 22 of the station building 5, the AC power being the surplus regenerative power 32.

The output electromagnetic contactor 9 is an electromagnetic contactor that is disposed closer to the power converter 8 than the point of contact between the AC system circuit 15 and the filter circuit 10, and opens and closes the path of the AC system circuit 15. The output electromagnetic contactor 9 outputs the surplus regenerative power 32 from the power converter 8 to the electrical apparatus 22 during normal operation.

The filter circuit 10 connects the AC system circuit 15 and the casing 14 in an AC-like manner, and causes a high-frequency current 33 generated by the power converter 8 to flow from the AC system circuit 15 to the casing 14. The filter circuit 10 includes three high-frequency capacitors 11-1 through 11-3. In the filter circuit 10, the ends of the high-frequency capacitors 11-1 through 11-3 on one side are connected by Y-connection, and the neutral point is connected to the casing 14. The Y-connected neutral point of the high-frequency capacitors 11-1 through 11-3 has a lower impedance than the AC system circuit 15 that is closer to the electrical apparatus 22 than the point of contact between the AC system circuit 15 and the filter circuit 10. Further, in the filter circuit 10, the ends of the high-frequency capacitors 11-1 through 11-3 on the other side are connected to the AC system circuit 15, or to different wires of the three-wire power line from one another.

The voltage sensor 12 detects a voltage value that is the value of the voltage between the casing 14 and the rails 3, which is a charged state of the casing 14. The casing 14 houses the high-speed circuit breaker 7, the power converter 8, the output electromagnetic contactor 9, the filter circuit 10, and the like, which are electrical components of the station building power supply 6.

In the station building power supply 6, the casing 14 is grounded to a grounding electrode 18, provided in the station building 5, by a grounding terminal 13-2 via a grounding wire 20. The power converter 8 is grounded to the grounding electrode 18 by a grounding terminal 13-1 via the casing 14 and the grounding wire 20. The voltage sensor 12 is grounded to the grounding electrode 18 by a grounding terminal 13-3 via the casing 14 and the grounding wire 20. Further, in the station building electrical room 16, the transformer 17 is grounded to the grounding electrode 18 by a grounding terminal 17-1. Further, the electrical apparatus 22 is grounded to the grounding electrode 18 by a grounding terminal 23. Here, in the station building 5, there are cases where each device cannot be grounded individually due to the installation environment such as a subway station or restrictions on the structure of the building. In the railroad system 100 in such a case, the grounding terminals of the respective devices are connected to the grounding electrode 18, and the grounding electrode 18 is shared so that the respective devices are grounded. In the example illustrated in FIG. 1, the grounding electrode 18 connected to the grounding terminal 17-1 of the transformer 17 is connected to the grounding terminal 13-2 of the casing 14 of the station building power supply 6 by the grounding wire 20. In this configuration, the transformer 17 and the power converter 8 connected to the casing 14 share the grounding electrode 18.

Next, an operation in which the power converter 8 supplies the surplus regenerative power 32 to the electrical apparatus 22 in the station building 5 is described. In the station building power supply 6, the power converter 8 converts the surplus regenerative power 31, which is DC power input via the high-speed circuit breaker 7, into the surplus regenerative power 32, which is AC power. The station building power supply 6 supplies the surplus regenerative power 32, which is the AC power converted by the power converter 8, to the electrical apparatus 22 via the output electromagnetic contactor 9 and the AC system circuit 15. Here, in the power converter 8, a high-frequency current is generated by the operation of converting the surplus regenerative power 31, which is DC power, into the surplus regenerative power 32, which is AC power. Like the surplus regenerative power 32, the high-frequency current leaks out of the power converter 8 through a path formed with the output electromagnetic contactor 9 and the AC system circuit 15.

In the station building power supply 6, however, the filter circuit 10 is connected between the AC system circuit 15 and the casing 14 in an AC-like manner. The filter circuit 10 has the neutral point at which the three high-frequency capacitors 11-1 through 11-3 are connected by Y-connection, and the neutral point is connected to the casing 14 with a low impedance. Accordingly, as illustrated in FIG. 1, the high-frequency current 33 output from the power converter 8 passes through the output electromagnetic contactor 9, the AC system circuit 15, the filter circuit 10, the casing 14, and the grounding terminal 13-1, and then returns to the power converter 8. In this manner, the high-frequency current 33 circulates in the station building power supply 6. As the station building power supply 6 includes the filter circuit 10 that connects the AC system circuit 15 and the casing 14 in an AC-like manner as described above, the high-frequency current 33 can be prevented from leaking out of the station building power supply 6, namely leaking into the electrical apparatus 22.

Further, in the existing station building 5, it may be difficult to add more grounding electrodes due to architectural restrictions. In a case where the station building power supply 6 shares the grounding electrode 18 of the station building 5 for new electrical apparatus 22 with the grounding terminal 13-1 of the power converter 8, the grounding terminal 17-1 of the transformer 17, the grounding terminal 23 of an existing electrical apparatus 22, and the like, the station building power supply 6 can also prevent the high-frequency current 33 from leaking out of the station building power supply 6. By preventing the high-frequency current 33 from leaking into the existing and a new electrical apparatus 22, the station building power supply 6 can prevent malfunction in the existing and new electrical apparatus 22.

Figure 2:
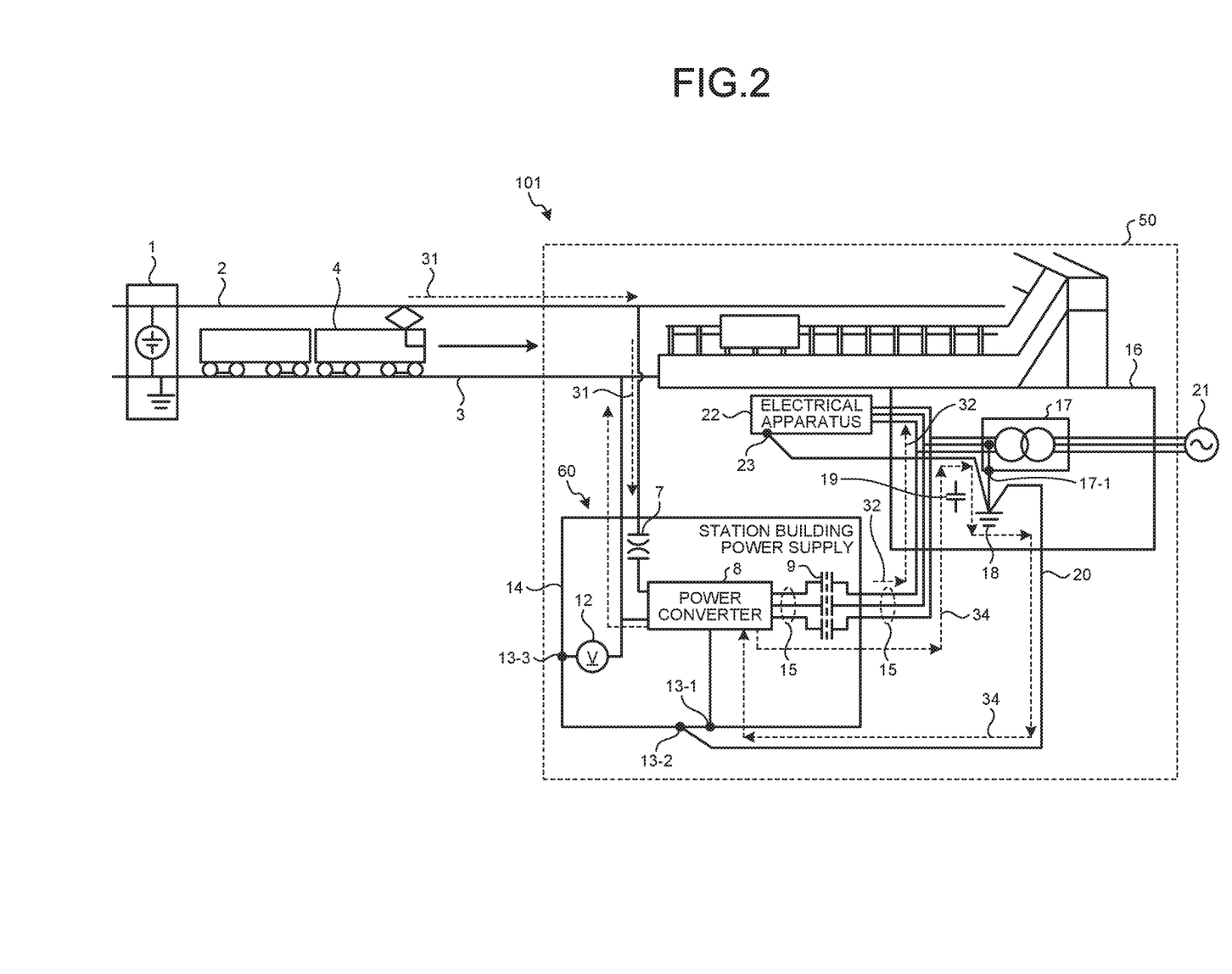
FIG. 2 is a diagram illustrating an example of the flow of a high-frequency current in a railroad system in a case where the filter circuit is omitted from the station building power supply according to the first embodiment.

Here, the flow of a high-frequency current in a case where the filter circuit 10 is not provided is described. FIG. 2 is a diagram illustrating an example of the flow of a high-frequency current 34 in a railroad system 101 in a case where the filter circuit 10 is omitted from the station building power supply 6 according to the first embodiment. FIG. 2 illustrates a comparative example, regarding the flow of the high-frequency current 33 in the railroad system 100 illustrated in FIG. 1. A station building 50 includes a station building power supply 60 in place of the station building power supply 6 of the station building 5 illustrated in FIG. 1. The station building power supply 60 is the same as the station building power supply 6 illustrated in FIG. 1, except that the filter circuit 10 is omitted. In the example illustrated in FIG. 2, the high-frequency current 34 generated by the power converter 8 leaks into the station building electrical room 16 via the output electromagnetic contactor 9 and the AC system circuit 15. The high-frequency current 34 that has flowed into the station building electrical room 16 passes through the grounding terminal 17-1, the grounding wire 20, and the grounding terminals 13-2 and 13-1, and returns to the power converter 8 of the station building power supply 60, via a floating capacitor 19 of the AC system circuit 15, V-phase grounding of the secondary side of the transformer 17, and the like. In other words, the high-frequency current 34 flows in a loop circuit including the station building electrical room 16 outside the station building power supply 60, as illustrated in FIG. 2. Here, if the high-frequency current 34 that has flowed into the station building electrical room 16 also flows into the electrical apparatus 22, the electrical apparatus 22 might be affected by the high-frequency current 34, and malfunction. Further, when the high-frequency current 34 flows in the path through which the transformer 17 supplies AC power to the electrical apparatus 22, there is a possibility that the transformer 17 will be affected by the high-frequency current 34, and the AC power output from the transformer 17 will also be affected.

In contrast to the station building power supply 60 illustrated in FIG. 2, the station building power supply 6 of the first embodiment illustrated in FIG. 1 can prevent leakage of the high-frequency current 33 from the station building power supply 6 even in a case where the grounding electrode 18 is shared by the grounding terminals of a plurality of devices in the station building 5. By preventing leakage of the high-frequency current 33 into the electrical apparatus 22, the station building power supply 6 can avoid a situation in which malfunction occurs in the electrical apparatus 22.

Although not illustrated in FIGS. 1 and 2, some of the diodes or the switching elements constituting the power converter 8 may be formed with wide bandgap semiconductors made of silicon carbide (SiC), gallium nitride (GaN), or diamond. Switching elements and diodes formed with such wide bandgap semiconductors have high voltage resistance and high allowable current density. Accordingly, the elements can be made smaller in size, and a semiconductor module incorporating these elements can also be made smaller in size. Further, those elements also have high heat resistance. Accordingly, the heat sink can be made smaller in size, and thus, the semiconductor module can also be made smaller in size. Furthermore, those elements have low power loss. Accordingly, the switching elements and the diodes can be made highly efficient, and the semiconductor module can also be made highly efficient. Alternatively, the same effects as above can be achieved with a MOSFET (Metal Oxide Semiconductor Field Effect Transistor) having a super junction structure that is known as highly efficient switching elements.

As described above, according to the first embodiment, in the station building power supply 6, the AC system circuit 15 that is the path of the AC power from the power converter 8 to the electrical apparatus 22, which is the surplus regenerative power 32, and the casing 14 are connected by the filter circuit 10 in an AC-like manner. The filter circuit 10 has the neutral point at which the three high-frequency capacitors 11-1 through 11-3 are connected by Y-connection, and the neutral point is connected to the casing 14 with a low impedance. In the station building power supply 6, the high-frequency current 33 generated in the power converter 8 returns to the power converter 8 via the output electromagnetic contactor 9, the AC system circuit 15, the filter circuit 10, the casing 14, and the grounding terminal 13-1, and thus, circulates in the station building power supply 6. In other words, even in a case where the grounding electrode 18 is shared between the power converter 8 in the station building power supply 6 and equipment in the station building electrical room 16 or the electrical apparatus 22, the station building power supply 6 can prevent the high-frequency current 33 generated in the power converter 8 from leaking out of the station building power supply 6 or the casing 14. Thus, the station building power supply 6 can prevent malfunction of the electrical apparatus 22 due to the high-frequency current 33 outside the station building power supply 6 or the casing 14.

Second Embodiment

In a second embodiment, the output portion from the AC system circuit 15 to the outside has a high impedance, and thus leakage of the high-frequency current 33 from the station building power supply to the outside is further reduced. The differences of the second embodiment from the first embodiment will be described below.

Figure 3:
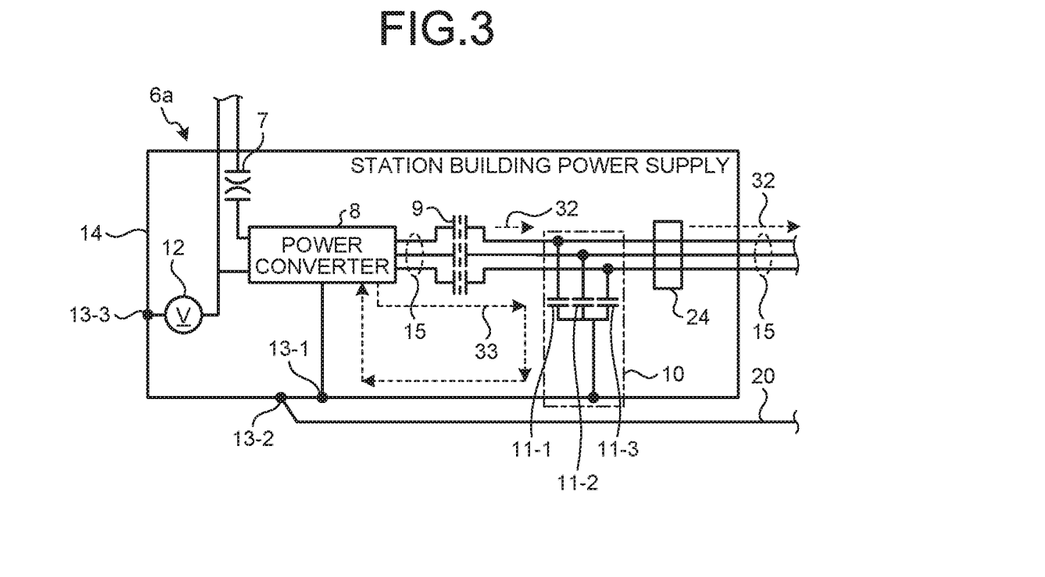
FIG. 3 is a diagram illustrating an example configuration of a station building power supply according to a second embodiment.

FIG. 3 is a diagram illustrating an example configuration of a station building power supply 6a according to the second embodiment. In a railroad system of the second embodiment, the station building power supply 6 of the railroad system 100 illustrated in FIG. 1 is replaced with the station building power supply 6a. Although not illustrated in the drawing, the railroad system of the second embodiment is a railroad system 100a, and the station building is a station building 5a, for ease of explanation. The railroad system 100a is the same as the railroad system 100 of the first embodiment illustrated in FIG. 1, except for the configuration of the station building power supply 6a.

The station building power supply 6a is the same as the station building power supply 6 of the first embodiment illustrated in FIG. 1, except for further including a core 24. The core 24 is designed to make the AC system circuit 15 a high-impedance circuit, to prevent the high-frequency current 33 from leaking out of the station building power supply 6a or the casing 14. The core 24 is a ferrite core, for example. The core 24 is normally has a ring-like shape. The AC system circuit 15 is made to extend through the ring hole of the core 24, so that the AC system circuit 15 and the core 24 constitute a coil, which is an inductor. The coil becomes higher in impedance as the frequency becomes higher. Accordingly, the core 24 functions as a low-pass filter that blocks the flow of the high-frequency current 33. In the station building power supply 6a, the core 24 in the AC system circuit 15 is disposed closer to the external electrical apparatus 22 than the point of contact between the AC system circuit 15 and the filter circuit 10. In the station building power supply 6a, the path to the outside of the AC system circuit 15, that is, to the electrical apparatus 22 has high impedance, so that more of the high-frequency current 33 flows into the filter circuit 10 than in the first embodiment.

As described above, according to the second embodiment, in the station building power supply 6a, the core 24 in the AC system circuit 15 is disposed closer to the electrical apparatus 22 than the point of contact between the AC system circuit 15 and the filter circuit 10. Accordingly, the station building power supply 6a can prevent leakage of the high-frequency current 33 from the power converter 8 to the outside more effectively than in the first embodiment. As a result, the station building power supply 6a can prevent malfunction of the external electrical apparatus 22 due to the high-frequency current 33 more effectively than in the first embodiment.

Third Embodiment

In a third embodiment, a circuit pattern different from that of the first embodiment is described.

Figure 4:
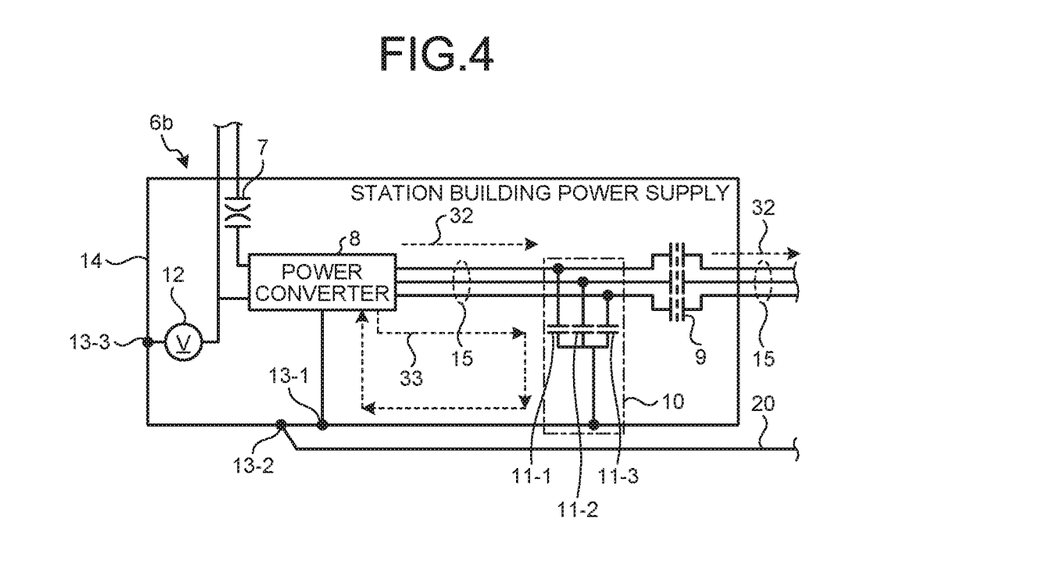
FIG. 4 is a diagram illustrating an example configuration of a station building power supply according to a third embodiment.

FIG. 4 is a diagram illustrating an example configuration of a station building power supply 6b according to the third embodiment. In a railroad system of the third embodiment, the station building power supply 6 of the railroad system 100 illustrated in FIG. 1 is replaced with the station building power supply 6b. Although not illustrated in the drawing, the railroad system of the third embodiment is a railroad system 100b, and the station building is a station building 5b, for ease of explanation. The railroad system 100b is the same as the railroad system 100 of the first embodiment illustrated in FIG. 1, except for the configuration of the station building power supply 6b.

In the third embodiment, as illustrated in FIG. 4, the positions of the output electromagnetic contactor 9 and the filter circuit 10 are switched in the station building power supply 6b. The output electromagnetic contactor 9 in the AC system circuit 15 is disposed closer to the power converter 8 than the point of contact between the AC system circuit 15 and the filter circuit 10 in the first embodiment. In the third embodiment, on the other hand, the output electromagnetic contactor 9 is disposed closer to the electrical apparatus 22 than the point of contact between the AC system circuit 15 and the filter circuit 10. In this case, the same effects as those of the first embodiment can also be achieved.

Fourth Embodiment

In a fourth embodiment, a circuit pattern different from that of the second embodiment is described.

Figure 5:
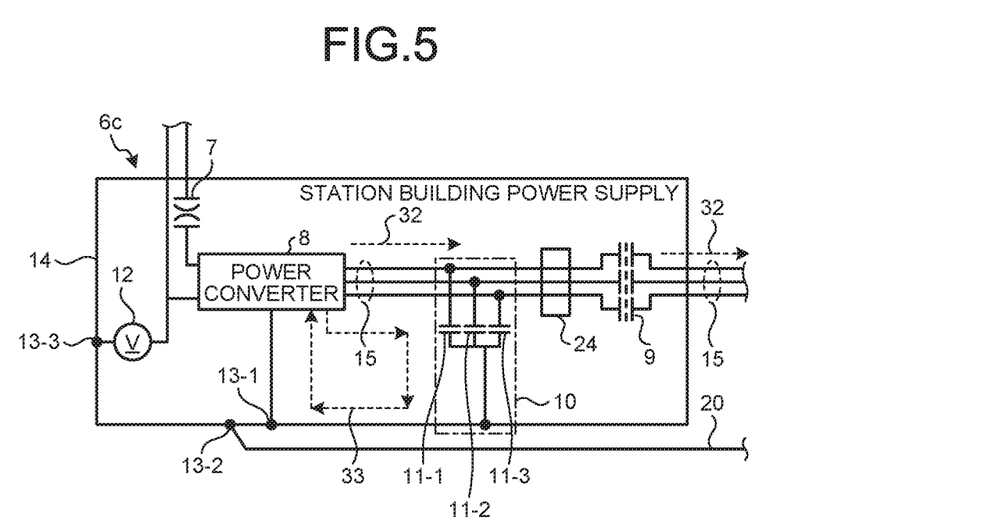
FIG. 5 is a diagram illustrating an example configuration of a station building power supply according to a fourth embodiment.

FIG. 5 is a diagram illustrating an example configuration of a station building power supply 6c according to the fourth embodiment. In a railroad system of the fourth embodiment, the station building power supply 6a of the railroad system 100a illustrated in FIG. 3 is replaced with the station building power supply 6c. Although not illustrated in the drawing, the railroad system of the fourth embodiment is a railroad system 100c, and the station building is a station building 5c, for ease of explanation. The railroad system 100c is the same as the railroad system 100a of the second embodiment illustrated in FIG. 3, except for the configuration of the station building power supply 6c.

In the fourth embodiment, as illustrated in FIG. 5, the positions of the output electromagnetic contactor 9, the filter circuit 10, and the core 24 are changed in the station building power supply 6c. The output electromagnetic contactor 9 in the AC system circuit 15 is disposed closer to the power converter 8 than the point of contact between the AC system circuit 15 and the filter circuit 10 in the second embodiment. In the fourth embodiment, on the other hand, the output electromagnetic contactor 9 is disposed closer to the electrical apparatus 22 than the point of contact between the AC system circuit 15 and the filter circuit 10, and than the core 24. In this case, the same effects as those of the second embodiment can also be achieved.

The configurations described in the above embodiments are examples of the subject matter of the present invention, and can be combined with other known techniques, or may be partially omitted or modified without departing from the scope of the present invention.

REFERENCE SIGNS LIST 1 electrical substation; 2 overhead line; 3 rails; 4 DC feeder train; 5 station building; 6 station building power supply; 7 high-speed circuit breaker; 8 power converter; 9 output electromagnetic contactor; 10 filter circuit; 11-1 to 11-3 high-frequency capacitor; 12 voltage sensor; 13-1 to 13-3, 23 grounding terminal; 14 casing; 15 AC system circuit; 16 station building electrical room; 17 transformer; 18 grounding electrode; floating capacitor; 20 grounding wire; 21 commercial power source; 22 electrical apparatus; 24 core; 31, 32 surplus regenerative power; 33, 34 high-frequency current; 100, 101 railroad system.

The invention claimed is:

1. A station building power supply comprising:
a power converter to convert DC power to AC power;
a casing housing the power converter;
an AC system circuit to supply the AC power output from the power converter to an electrical apparatus outside the casing; and
a filter circuit to apply a high-frequency current generated in the power converter from the AC system circuit to the casing to prevent the high-frequency current from leaking out of the station building power supply,
wherein the power converter and the casing are grounded.

2. The station building power supply according to claim 1, wherein
the AC system circuit is a three-wire power line, and,
in the filter circuit, ends of three high-frequency capacitors on one side are connected by Y-connection, a neutral point is connected to the casing, and ends of the three high-frequency capacitors on the other side are connected to different wires of the three-wire power line from one another.

3. The station building power supply according to claim 1, further comprising
an electromagnetic contactor to open and close a path of the AC system circuit, the electromagnetic contactor being disposed closer to the power converter than a point of contact between the AC system circuit and the filter circuit.

4. The station building power supply according to claim 1, further comprising
an electromagnetic contactor to open and close a path of the AC system circuit, the electromagnetic contactor being disposed closer to the electrical apparatus than a point of contact between the AC system circuit and the filter circuit.

5. The station building power supply according to claim 1, further comprising
a core disposed closer to the electrical apparatus than a point of contact between the AC system circuit and the filter circuit.

6. The station building power supply according to claim 1, wherein
a grounding terminal of a transformer that converts a voltage of AC power supplied from a commercial power source into a voltage that can be used in the electrical apparatus, and a grounding terminal of the casing are connected to a grounding electrode provided in a station building.

7. The station building power supply according to claim 6, wherein
the electrical apparatus is provided in the station building, and a grounding terminal of the electrical apparatus and the grounding terminal of the casing are connected to the grounding electrode.

8. The station building power supply according to claim 1, wherein
some of diodes or switching elements constituting the power converter are formed with a wide bandgap semiconductor.

9. The station building power supply according to claim 8, wherein
the wide bandgap semiconductor is made of silicon carbide, gallium nitride, or diamond.

* * * * *